United States Patent [19]

Bjelk

[11] Patent Number: 4,827,264
[45] Date of Patent: May 2, 1989

[54] APPARATUS FOR CONTROLLING THE OPENING AND CLOSING OF DOORS

[75] Inventor: Nils Bjelk, Landskrona, Sweden

[73] Assignee: Besam AB, Landskrona, Sweden

[21] Appl. No.: 730,423

[22] Filed: May 6, 1985

[30] Foreign Application Priority Data

Sep. 26, 1984 [SE] Sweden .................... 8404827

[51] Int. Cl.⁴ .............................. G01S 13/86
[52] U.S. Cl. ........................ 342/61; 367/96; 49/324
[58] Field of Search ........... 343/7 ED; 340/323, 526, 340/555, 556, 557; 250/242; 367/93, 94, 95, 96; 49/324, 25, 31

[56] References Cited

U.S. PATENT DOCUMENTS

| | | |
|---|---|---|
| 2,003,535 | 6/1935 | Green . |
| 3,662,229 | 5/1972 | Graff et al. ............... 49/31 X |
| 4,141,091 | 2/1979 | Puluari ..................... 367/96 |
| 4,272,762 | 6/1981 | Geller et al. ............... 340/556 |
| 4,403,142 | 9/1983 | Kondo ...................... 250/221 |
| 4,560,912 | 12/1985 | Jönsson ...................... 49/25 X |
| 4,565,029 | 1/1986 | Kornbrekke et al. .......... 49/25 |
| 4,577,437 | 3/1986 | Gionet et al. ............... 49/25 |
| 4,614,057 | 9/1986 | Sorber ...................... 49/31 X |
| 4,697,383 | 10/1987 | Hagiwara ................... 49/25 |

Primary Examiner—Thomas H. Tarcza
Assistant Examiner—Mark Hellner
Attorney, Agent, or Firm—Brumbaugh, Graves, Donohue & Raymond

[57] ABSTRACT

An arrangement for controlling operation of a motor operated door is provided with doppler radar sensors facing the approach to the door from both sides. The doppler signals from the sensors are analyzed to determine the presence of motion toward or away from the door and the door is controlled to open upon motion toward the door and close upon motion away from the door.

10 Claims, 3 Drawing Sheets

APPARATUS FOR CONTROLLING THE OPENING AND CLOSING OF DOORS

BACKGROUND OF THE INVENTION

The present invention relates to apparatus for controlling the automatic opening and closing of doors. Known arrangements for control of automatically opened doors includes sensors which sense either the present or the movement of an object or person in the vicinity of the door. Such sensors include photocell detectors and doppler radar detectors.

According to known arrangements, the doppler radar senses movement of a person toward the door which triggers the opening of the door. The door is usually closed by operation of an automatic timing circuit, which holds the door in a fully opened position for a pre-selected time, this is usually generously allotted so that a slow moving person will have time to pass through the door. It will be recognized that it is desirable that the door not be opened for too long a period, because of the resulting loss of heat or air conditioning to the building. Present arrangements for automatic closing of the door usually rely on photocell or floor-mat detection of the passage of a person, for purposes of providing a closing operation.

Operational difficulties are encountered in such prior art systems in the event a person walks toward the door, is detected by the doppler radar to open the door, and then walks away without passing through the door. In this case, the prior art systems do not detect the passage of the person through the door and the door remains open until closed by an automatic time circuit.

Another difficulty with such prior art systems arises when a door is situated along a frequently used walk. The doppler radar may detect the motion of a person in a direction generally traverse to door opening, causing the door to open. Again, since the person does not pass through the door, the door remains opened for an unduly long period of time.

It is an object of the present invention to provide a new and improved arrangement of sensing devices and control circuits for detecting the movement of objects and persons and controlling operation of an automatic door.

It is an object of the invention to provide such an arrangement which solves the problems associated with prior art devices in situations where a person walks toward a door opening, is detected, and then does not pass through the door opening.

SUMMARY OF THE INVENTION

In accordance with the present invention there is provided apparatus for controlling the operation of a motor operated door or the like. The apparatus includes means for detecting movement of a person or object toward the door, and for detecting movement of a person or object away from the door. There is further provided door control means which is responsive to the detection of the movement toward the door to operate the motor to open the door, and responsive to detection of movement away from the door to operate the motor to close the door. The means is also responsive to no detected movement to maintain the door in its current position. The door opening control has priority over the door closing control.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
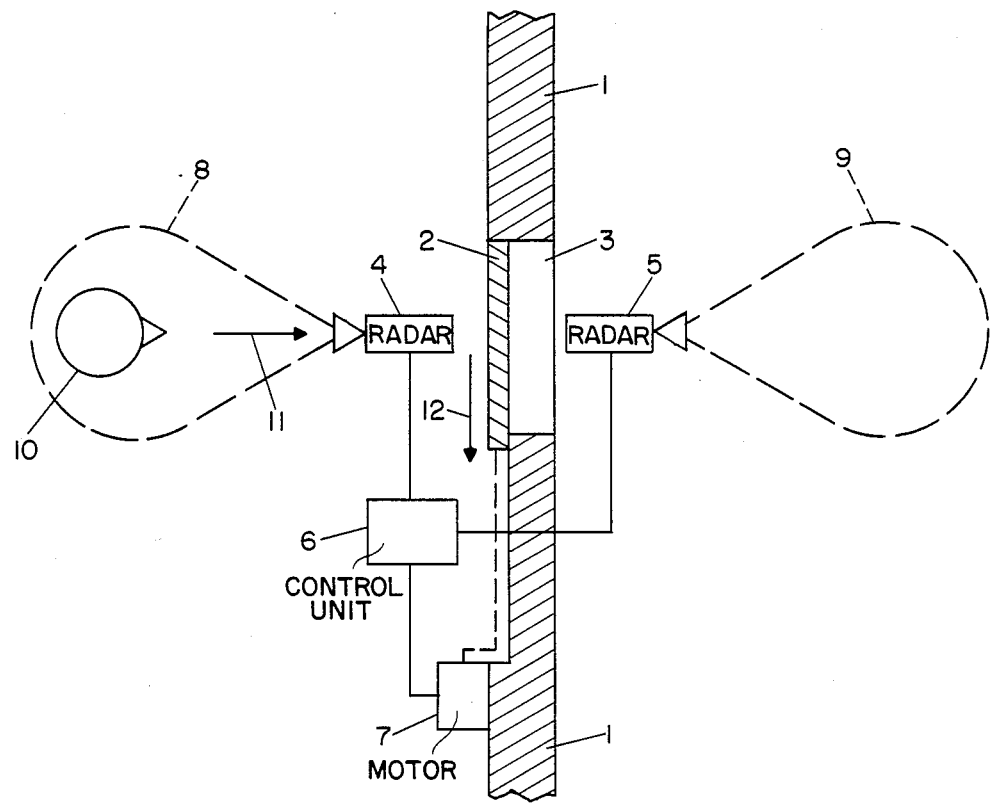
FIG. 1 is a top view of an automatically operated slide door having detectors and a control system in accordance with the present invention.

Referring to FIG. 1 there is shown a portion of a wall 1, which includes a sliding automatic door 2 covering a door opening 3. Above the door opening on either side of the door there are provided doppler radar sensors 4 and 5, which are connected to an electronic control unit 6 which generates signals for operation of motor 7 which opens and closes the door 2. Each sensors provides a radiation lobe within which the motion of people or objects toward and away from the door may be detected. Doppler radar sensor 4 includes a radiation lobe 8 pointing outwardly in the direction of approach 11 toward the door. A person 10 is shown approaching the door 2 within the detection lobe 8. Likewise radar sensor 5 includes a radiation lobe 9 pointing outwardly on the opposite side of door 2. When a person 10 is moving in a direction of arrow 11 toward door 2, sensor 4 provides a doppler radar signal to electronic unit 6, which actuates the motor 7 to open the sliding door 2 in the direction of arrow 12.

Figure 2:
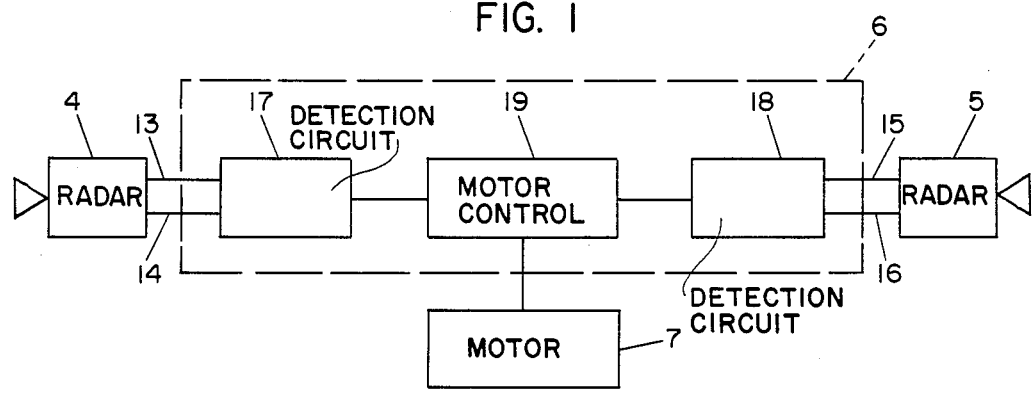
FIG. 2 is a block diagram showing the interconnection of the detectors and control unit in the door opening apparatus in accordance with the present invention.
Figure 4:
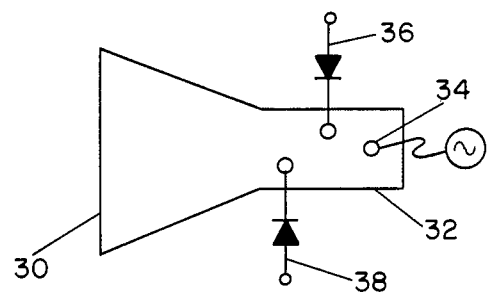
FIG. 4 is a schematic illustration of the arrangement of a doppler radar apparatus, known in the prior art, and useful in connection with the present invention.
Figure 5:
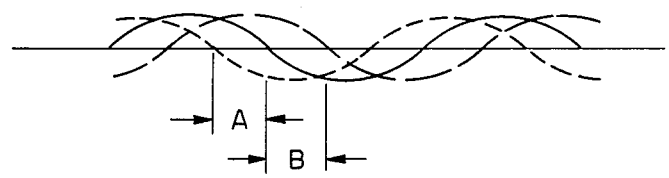
FIG. 5 is a drawing showing the voltage wave forms obtained using a doppler radar of the type shown in FIG. 4.

For purposes of further explaining the operation of the arrangement in accordance with the present invention, reference is made to the block diagram of FIG. 2. Sensors 4 and 5 are connected by output leads 13, 14 and 15, 16, respectively, to electronic unit 6. A known type of doppler radar sensors is shown in somewhat greater detail in FIG. 4, wherein it may be seen that the sensor includes a microwave horn 30, which is attached to a waveguide 32. At one end of waveguide 32 there is provided a low power microwave signal source 34, which may be an oscillating diode. Signal source 34 causes radiation of CW microwave signals from horn 30. As a person approaches the unit, radiation reflected from the person is received by horn 30 and mixed with the original CW signal in mixer diodes 36 and 38, which are spaced along waveguide 32, and separated by a distance corresponding to a quarter wave length. The output of mixer diodes 36 and 38 correspond to doppler frequency signals, having a frequency between 5 and 200 Hz, depending on the speed of motion of the person or object approaching. The relative phase of the doppler radar signals which are detected in diodes 36 and 38 is different, and the phase leads or lags, depending on whether the motion is toward or away from horn 30. These signals are illustrated in FIG. 5, where a solid curve shows the detected doppler signal provided from one of the mixer diodes, for example, diode 36, and the dotted lines show leading or lagging doppler signals detected by mixer diode 38, depending upon whether the movement is toward or away from the detector. As shown in FIG. 5, the signal detected in mixer 38 will lead or lag by phase angles A and B, respectively.

Referring again to FIG. 2, the signal from mixer diode 36 is provided on lead 13 to detection circuit 17 and the signal from mixer diode 38 is provided by lead 14 to detection circuit 17. Circuit 17, which will be described in further detail, provides an output signal to motor control 19, indicating whether it has detected movement toward or away from the door, or has detected no movement at all. Likewise doppler radar 5 is connected by leads 15 and 16 to circuit 18, which is similar to circuit 17 and provides a signal to motor control 19 indicating motion toward or away from the opposite side of door 2.

When either of the doppler radars shown in FIG. 1 detects movement of a person or object toward door 2, a signal is provided to motor control 19 which causes motor 7 to operate and open the door in the direction 12 shown in FIG. 1. When there is no motion detected by either of the doppler radars, the door is maintained in its current position, i.e., open or closed. When either of the doppler radars sense the movement of a person or object away from the door, a signal is provided to motor control 19 which causes operation of motor 7 to close the door. Motor control 19 is arranged to provide preference for opening the door over closing the door, when conflicting signals are received, thereby to provide assurance that the door will not be closed while someone is passing through.

In a preferred arrangement of the present invention, circuits 17 and 18 provide binary level signals to motor control 19 which give an indication of their status in detecting movement toward or away from the door. Preferably, circuits 17 and 18 provide a low voltage control signal to motor control 19 in the event there is a detection of movement toward the door. The low voltage control signal is provided by a circuit with a low impedance, so that the supply of a low voltage signal from one of the circuits 17, 18, and a high level from the other circuit 17, 18, causes a low voltage at the common input to motor control 19 resulting in opening of the door. In the even circuit 17 or 18 detects movement away from the door, an alternating voltage control signal, switching between the high and low voltage levels as a pulse train, is provided to motor control 19. In this event the low level of the pulse train will override a high level signal from the other detector and cause a closing of the door when an alternating voltage control signal is provided from only one of the circuits 17, 18. Also the closing control signal, being alternating between high and low voltage, will be overridden by a low voltage opening control signal received from the other of circuits 17, 18. When no movement is detected by either circuit 17 or 18 a high voltage level control signal is provided to circuit 19. This high voltage control signal is provided from a relatively high impedance and can be overridden by either the low voltage control signal, which signals door opening, or by an alternating voltage control signal, which signals door closing. Motor control unit 19 responds to the high voltage control signal to maintain the door in its current position, either open or closed.

Assuming an initial state, wherein there is no motion detected by either radar 4 or 5, both circuits 17 and 18 will provide a high voltage control signal to motor control 19, and the door remains in a closed position. As a person, illustrated as 10 in FIG. 1, approaches the door, sensor 4 detects motion toward the door and provides a low voltage signal to motor control 19, overriding the high voltage control signal provided by circuit 18, and causing control 19 to operate motor 7 to open the door. As the person 10 passes through the door, no motion is detection by either radar 4 or radar 5, and both circuits 17 and 18 provide a high voltage control signal to motor control 19, which causes the door to remain in the open position during the passage. As the person continues walking in direction 11 he enters lobe 9 of radar sensor 5, which provides doppler signals to circuit 18, indicating movement away from the door opening. Circuit 18 respond by providing an alternating high-low voltage control signal to motor control 19, overriding the high voltage level from circuit 17 and causing motor control 19 to operate motor 7 to close the door. Accordingly the door is rapidly and efficiently closed as soon as person 10 has passed therethrough.

An advantage of the present invention is provided in the event person 10 approaches door 2 and enters lobe 8 causing the door to open. The person 10 then decides not to enter the door and starts walking in a direction out of lobe 8, opposite to arrow 11. In this event the signal provided by sensor 4 to circuit 17 indicates movement away, and circuit 17 responds by immediately supplying the alternating voltage control signal to motor control 19, thereby causing a rapid closing of door 2 by motor 7. Accordingly, door 2 is not unnecessarily kept opened.

In another operating condition, which has caused problems in prior art arrangements, a person 10 may be walking in a direction which is generally parallel to wall 1 and thereby pass through lobe 8 without intending to pass through door 2. In this event as he enters lobe 8 a signal may be provided indicating an approach by radar sensor 4 and circuit 17 will provide an opening signal to motor control 19. However, as the person passes midway through the lobe 8, a movement away signal will immediately be provided to motor control 19 causing rapid closing of the door.

In accordance with the invention it is also possible to provide circuitry which responds to the speed of a person moving toward the door, and may in some cases discriminate between a person walking directly toward the door and a person who is walking parallel to wall 1. The circuit shown in block diagram form in FIG. 3 provides for an opening signal to be indicated to motor control 17 only when a person is moving toward the door with sufficient speed to indicate that he intends to pass through it.

Figure 3:
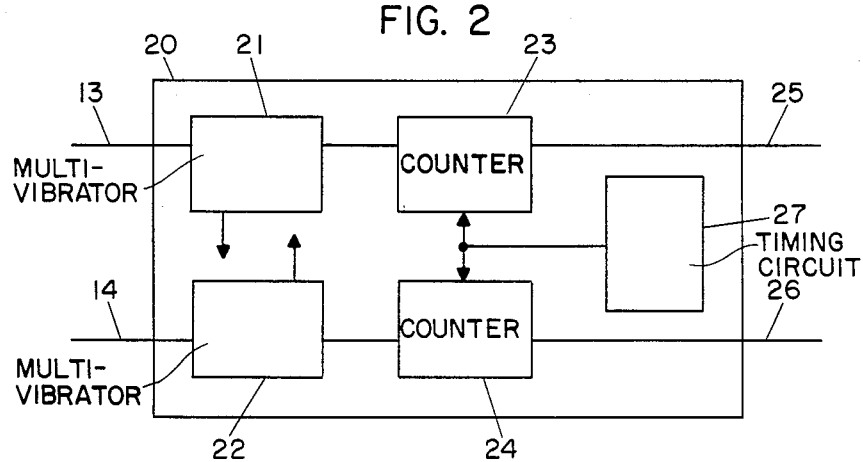
FIG. 3 is a block diagram illustrating the operation of a portion of the control circuit used in the apparatus of the present invention.
Figure 6A:
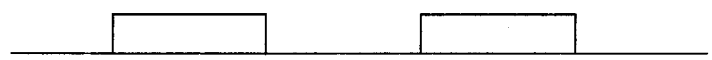
FIGS. 6A, 6B and 6C are drawings illustrating digitized doppler radar signals, which are obtained from the signals having the wave forms of FIG. 5.
Figure 6B:
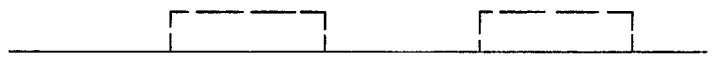
Figure 6C:
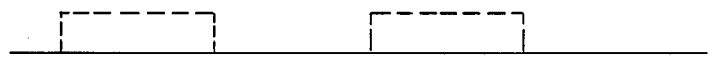

FIG. 3 is a block diagram of a portion of control circuit 17, which responds to digitized doppler signals provided on leads 13 and 14. The circuit includes latch circuits 21 and 22, which receive the output of a digital to analog converter responding to the doppler radar signals shown in FIG. 5. The digitized doppler signals form digital pulse streams, shown in FIGS. 6A, 6B and 6C. FIG. 6A shows the digital reference signal, provided by mixer diode 36, after it has been converted to a digital form. FIG. 6B shows a digital doppler signal, with lagging phase, which is derived from the analog signal provided by mixer diode 38, signifying motion toward a door, and FIG. 6C shows a digitized doppler signal which has a leading phase, which may be supplied by digitization of the signal from mixer diode 38 for movement away from a door. The digital doppler signals shown in FIG. 6A and either 6B or 6C, depending on the detected motion, are supplied to multivibrator latch circuits 21 and 22, each of which is connected to a separate counter circuit 23 and 24. Multivibrator circuits 21 and 22 are interconnected such that when a pulse is provided to one of the circuits, the operation of the other in inhibited. Accordingly, only one multivibrator 21, 22 will supply pulses to its corresponding counter 23, 24 depending upon whether the signal of FIG. 6B or 6C is present. When the FIG. 6A signal is supplied on lead 13 to multivibrator 21, and the FIG. 6B signal is supplied on lead 14 to multivibrator 22, the FIG. 6A pulses on lead 13 will inhibit operation of multivibrator 22, and therefor pulses will be passed to counter 23 and not to counter 24. In the alternate, if the signal on lead 14 corresponds to the signal format shown in FIG. 6C, which leads the signal supplied on lead 13, multivibrator 21 will be inhibited and pulses will be supplied only to counter 24. Operation of either counter 23 or counter 24 indicates the direction of movement of a person or object toward or away from the sensor. A timing circuit 27 is provided to periodically reset counters 23 and 24. The counters are arranged so that a predetermined number of digital doppler signal pulses must be counted before resetting in order to activate a motion detection output signal on lead 25 or 26. Typically these counters would be arranged so that 3 to 5 digitized doppler pulses must be detected in one of the counters before the time reset pulse from pulse generator 27 resets the counter. Upon the detection of the required number of pulses, a signal is output on lead 25, 26 and supplied to further logic to format the control signal which is supplied to motor control 19.

Figure 8:
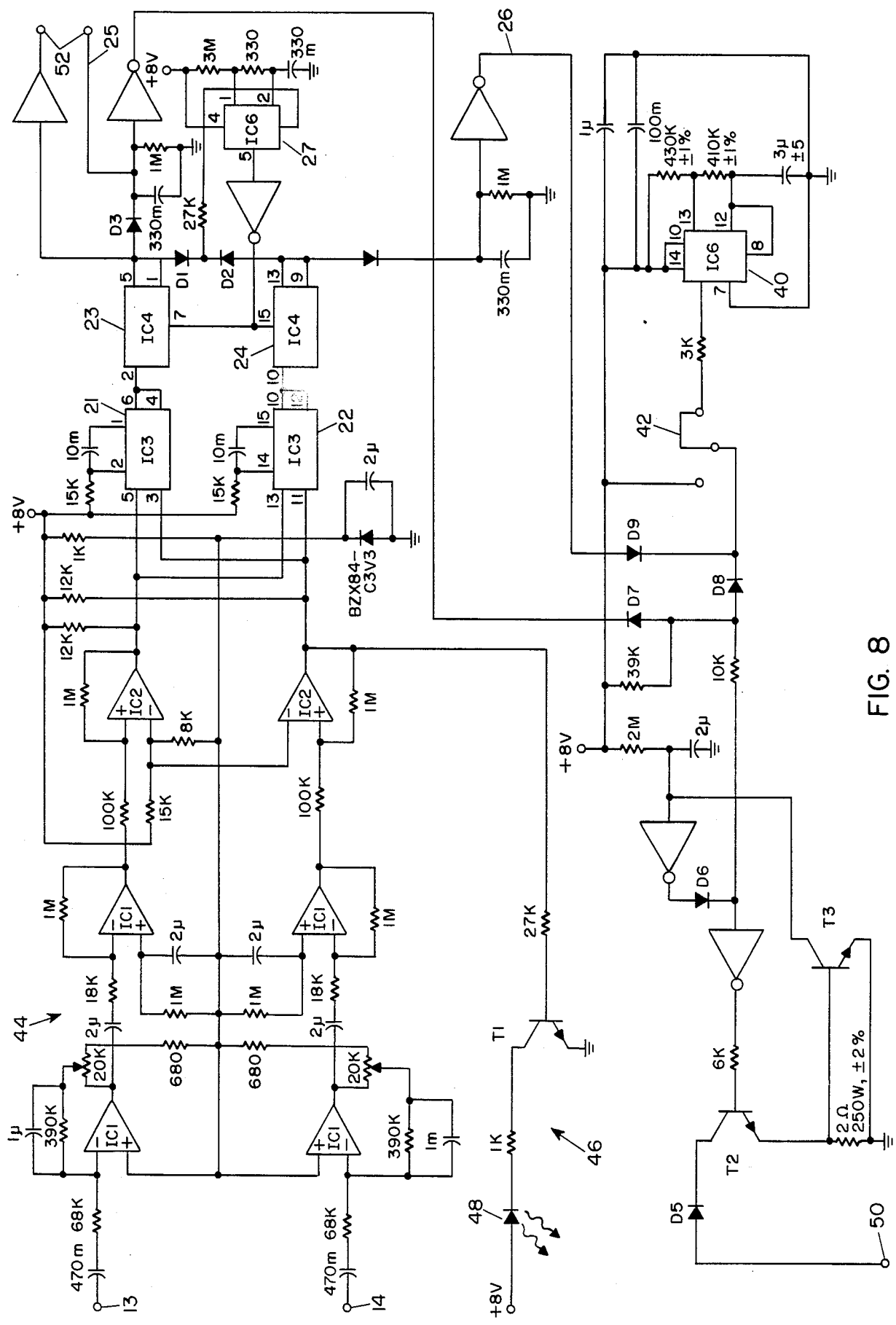
FIG. 8 is a circuit diagram showing a detection and control signal generating circuit useful in the apparatus of the present invention.

FIG. 8 is a circuit diagram showing one of the control circuits 17, 18 used in the present invention. The circuit shown in FIG. 8 includes initial amplifier section 44, which is formed from four differential amplifiers, provided on a single integrated circuit type LM2902. Analog to digital conversion, from the signal format of FIG. 5 to the signal format of FIG. 6, is provided in two places by a single integrated circuit, identified as IC2 which is a type LM2903. The two latch circuits, which respond to the digital doppler signal and comprise multivibrators 21 and 22 are shown as IC3, which is type HEF4098BT. As shown in the circuit diagram, the digitized doppler signal from lead 14 is provided to pin 3 to form an inhibit signal for multivibrator 21 and the digitized doppler signal from lead 13 is provided to pin 13 on multivibrator 22 as an inhibit signal.

The outputs of multivibrators 21 and 22 are provided to counter circuits 23 and 24 which are on a single integrated circuit, designated IC4 in FIG. 8, which is and type HEF4520BT. Counter circuits 23 and 24 are arranged to provide an output signal after a selected number of counts are received from multivibration 21, 22, for example, 3 to 5 pulses. These counter circuits are periodically reset by a reset timer 27 provided on integrated circuit IC6 which is type RC556. The other half of integrated circuit IC6 is timer 40, which provides a periodic pulse signal, used in generating the door closing output signal as will be further described. Reset circuit 27 provides a reset signal to counters 23 and 24 at a rate of 1.18 Hz. The outputs of counters 23 and 24 are provided to appropriate inverter circuits, which are formed on an integrated circuit type HEF40106BT. The inverted outputs on leads 25 and 26 initiate the generation of control signals to open or close door 2. Lead 25 provides a door opening signal when it is in a low voltage condition. Lead 26 provides a door closing signal when it is in a low voltage condition. As previously mentioned, circuit 40 provides periodic pulse signals at a rate of 167 Hz which are used in generating the door closing output signal. Diodes D8 and D9 combine the low level door closing output signal on lead 26 with the periodic signal provided by circuit 40 to the output stage and eventually to output terminal 50. The door opening signal on lead 25 is provided to the output through diode D7. The arrangement of diodes D7, D8 and D9 is such that the door opening signal on lead 25 will override the door closing signal and that either the door opening or door closing signal will override a nondetection signal, represented by a "high" logic level on leads 25 and 26. The output stage of the circuit, which is connected to output terminal 50, has a low impedance at a low voltage level, so that when output terminals 50 of two such circuits are connected together, the combined output will be drawn preferably to a low condition. Accordingly, the door opening signal overrides the door closing and nondetection signals, and the door closing signal overrides the nondetection signal. The circuit shown in FIG. 8 includes an indicator LED 48 with a driver circuit 46 which indicates the detection of doppler signals.

It is assumed that the doppler signals are supplied on leads 13 and 14, and actuate the respective multivibrator circuits 21 and 22 by their respective phase positions, so that if a movement towards the sensor 4 occurs, the multivibrators provide pulses corresponding to the doppler frequency obtained, these pulses being supplied to the counter 23 for counting. The pulses are counted during a given time interval, such that only a minimum number of pulses per time interval are required to enable an output control signal on lead 25. By counting pulses during a given time interval, determined by the timing circuit 27, which resets counters 23 and 24, there is obtained an indication of the distance a person or object has moved towards sensor 4, as well as the rate of movement. The criteria required for the door to open may thus be determined according to the number of counts required for an output control signal. If the person moves away from the sensor 4, the doppler phase will be such that pulses are supplied from multivibrator 22 to the counter circuit 24, which then counts in the same way as the counter 23. If the criteria are met, a closing control signal is provided on lead 26, causing closing movement of the door.

If it is assumed that the equipment as illustrated in FIG. 1 is disposed along the side of a corridor and a person approaches the lobe 8 of the sensor 4 walking in a direction parallel to wall 1, a pulse count will be started in the counter 23. However, the number of counts needed for a control signal on lead 25, signifying an opening movement, may be set so that the control signal does not occur until the person has reached the middle of the lobe. Immediately after this count, the sensor starts to detect outward doppler movement if the person moves away from the lobe 8 by continuing in the original direction. This means that the door is kept closed, even if the person quite clearly passes through the sensing zone 8 of the sensor 4. If a person moves towards the sensor 4 and the criteria for opening the door are thus present, a door opening operation will naturally take place. If the person in question should change his mind and walk out again, a minus movement will immediately be detected and counted within the detection area of the sensor, thus causing the door to close.

In all the embodiments described above, such conventional measures must naturally be taken so that if the outgoing movement of a person is not registered for some reason, a time circuit will even so ensure that the door closes.

Figure 7:
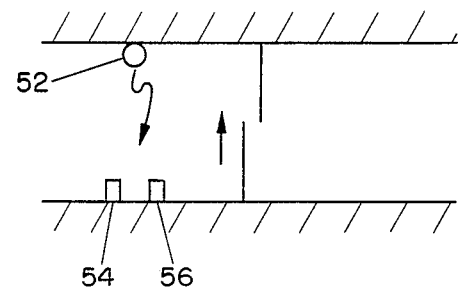
FIG. 7 is an illustration showing the arrangements for photodetector units for use in connection with the door control apparatus of the present invention.

In a similar arrangement, the sensors 4 and 5 can be replaced with photoelectric detectors. The photoelectric detector can be arranged as shown if FIG. 7, such that a light source 52 illuminates two adjacent photocells 54, 56, such that if a person moves across the beams, the nearest beam is interrupted first, and the next one afterwards. A movement direction indication can thus be easily provided. Such sensors can thus be connected to the operation circuits previously described for the door, but the degree of control obtained with doppler radar sensors cannot be achieved. All the circuits described above must naturally be implemented so that the opening control signal dominates over the closing control signal. This eliminates the risk of squeezing a person or object by a closing door. This priority can be achieved by priority logic as described.

While there have been described what are believed to be the preferred embodiment of the present invention, those skilled in the art will recognize that other and further changes may be made thereto without departing from the spirit of the invention, and it is intended to claim all such changes and modifications as fall within the true scope of the invention.

I claim:

1. Apparatus for controlling the operation of a motor-operated door, comprising:
    detecting means for providing a first signal representative of detection of movement of a person or object toward said door, a second signal representative of detection of movement of a person or object away from said door and a third signal representative of no detected movement;
    and motor control means coupled to said motor operated door and responsive to said first signal to open said door, to said second signal to close said door, and to said third signal to hold said door in position; said control means giving priority to said first signal over said second and third signals and to said second signal over said third signal.

2. Apparatus as specified in claim 1 wherein said detecting means are provided on both sides of said door and wherein said control means is responsive to said first, second and third control signals from both of said detecting means.

3. Apparatus as specified in claim 1 wherein said detecting means comprises a doppler radar, said doppler radar including a receiver responsive to doppler frequency phase of reflected signals for providing first and second digital pulse trains at said doppler frequency, means for comparing the phase of said first and second digital pulse trains to provide either a third or a fourth digital pulse train representing respectively movement of a person or object toward or away from said detector, and means for counting said third or fourth digital pulse train for generating said first or second control signals.

4. Apparatus as specified in claim 3 wherein said means for counting said pulse train counts said train during predetermined time intervals.

5. Apparatus as specified in claim 4 wherein said predetermined time intervals and said counting circuits are arranged such that said first control signal is not generated upon passage of a person or object transversely with respect to said doppler radar.

6. Apparatus as specified in claim 1 wherein said detector provides digital signals representing said first, second and third signals, and wherein said detector provides said second signal in the form of an alternating digital signal.

7. Apparatus as specified in claim 6 wherein said detector provides a low voltage digital signal for said first signal, a high voltage digital signal for said third signal and a signal alternating between said high and low voltages for said second signal.

8. Apparatus as specified in claim 1 wherein said detecting means comprises a pair of photocells arranged to detect direction of movement toward or away from said door.

9. Apparatus for controlling the operation of a motor operated door, comprising:
    motor control means, having an input terminal, and responsive to a first voltage level at said input terminal to open said door, responsive to a second voltage level at said input terminal to maintain said door in position and responsive to voltage level alternating between said first and second levels to close said door;
    a doppler radar mounted on each side of said door facing the path of approach to said door, each of said radars being arranged to provide first and second doppler frequency output signals in response to movement of an object on a corresponding path towards or away from said door, the relative phase of said first and second doppler frequency output signals being representative of the direction of said movement;
    and a control voltage generating circuits, coupled to each of said radars and each having a control voltage output terminal coupled to said input terminal of said motor control means, each of said generating circuits comprising means responsive to said first and second doppler frequency signals for comparing the phase of said doppler signals to determine said direction of movement and for determining the frequency of said doppler signals, and means for providing an output voltage at said output terminals, said output voltage having said first value when said doppler phase indicates movement toward said door and said doppler frequency exceeds a first selected value, said output voltage alternating between said first and said second levels when said doppler phase indicates movement away from said door and said doppler frequency exceeds a second selected value and said output voltage having said second level when said doppler frequency is below said first and second selected levels for a corresponding doppler phase, said circuits being arranged to cause said first voltage at said input terminal when said first voltage is supplied from either of said generating circuits.

10. In an apparatus for controlling the operation of a motor operated door, apparatus for detecting movement of a person or object toward said door, for separately detecting the movement of a person or object away from said door and providing a signal condition indicating the absence of motion, and a door control means responsive to detection of said movement toward said door to operate said motor to open said door, responsive to detection of said movement away from said door to operate said motor to close said door, and responsive to said signal condition of no detected movement of maintain said door in position, said door opening having priority of control over said door closing or maintaining said door in position, and said door closing having priority of control over maintaining said door in position.

* * * * *

UNITED STATES PATENT AND TRADEMARK OFFICE
CERTIFICATE OF CORRECTION

PATENT NO. : 4,827,264

DATED : May 2, 1989

INVENTOR(S) : Nils Bjelk

It is certified that error appears in the above-identified patent and that said Letters Patent is hereby corrected as shown below:

First Page, First Col., before last line, insert:
--4,009,476   2/1977   Lutz   343-7ED--

Col. 1, line 10, "present" should read --presence--.
Col. 2, line 39, "sensors" should read --sensor--.
Col. 3, line 55, "even" should read --event--.
Col. 4, line 18, "detection" should read --detected;
        line 25, "respond" should read --responds--.
Col. 5, line 18, "in" should read --is--;
        line 25, "therefor" should read -- therefore--;
        line 65, "and type" should read --type--;
        line 67, "multivibration" should read "multivibrators--;
Col. 7, line 21, "if" should read --in--.
Col. 8, line 47, "and a" should read -- and--.
Col. 10, line 4, "of maintain" should read --to maintain--.

Signed and Sealed this

Twenty-fourth Day of October, 1989

Attest:

DONALD J. QUIGG

*Attesting Officer*   *Commissioner of Patents and Trademarks*